United States Patent [19]

Chamberlain

[11] 3,872,891

[45] Mar. 25, 1975

[54] PIPES

[75] Inventor: Noel Christopher Chamberlain, Eye, England

[73] Assignee: Perkins Engines Limited, London, England

[22] Filed: Jan. 19, 1973

[21] Appl. No.: 324,944

[30] Foreign Application Priority Data
Jan. 22, 1972 United Kingdom............. 3139/72
Jan. 5, 1973 United Kingdom............. 701/73

[52] U.S. Cl................ 138/177, 138/103, 138/111, 138/DIG. 11
[51] Int. Cl............................................. F16l 9/18
[58] Field of Search .......... 138/103, 111, 115, 177, 138/178, DIG. 11

[56] References Cited
UNITED STATES PATENTS
2,896,975  7/1959  Wahl et al. .................. 138/177 X
3,625,257  12/1971  Schroeder..................... 138/115 X Primary Examiner—Charles A. Ruehl
Attorney, Agent, or Firm—Thomas P. Lewandowski

[57] ABSTRACT

A pipe assembly of rectangular cross section which comprises a pipe extruded from a suitable malleable material. The pipe comprises a wall of non-uniform thickness and a through passageway which is sealed at one end by a plug and is adapted to be connected to a conventional pipe fitting by a screwed fitting at the other end. Transverse holes intersect the through passageway. A banjo bolt passes through the hole and fastens the pipe to a fuel injector. Sealing between the pipe, the injector and the bolt is effected by local deformation of the surface of the pipe.

The pipe is suitable for use as a leak-off pipe for fuel injection equipment for returning leaked fuel to a low pressure zone of the fuel system.

15 Claims, 10 Drawing Figures

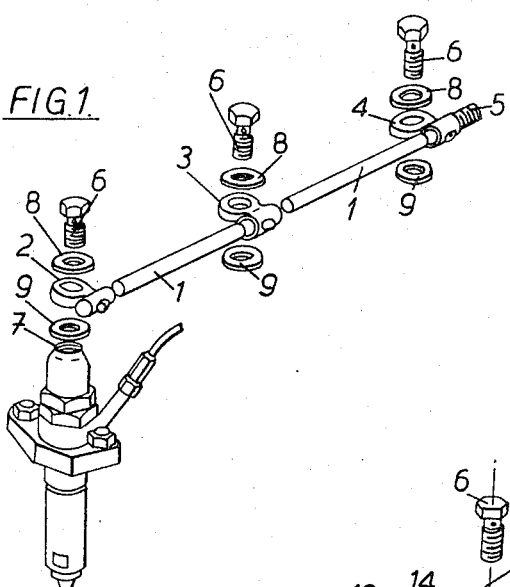
PRIOR ART FIG.1
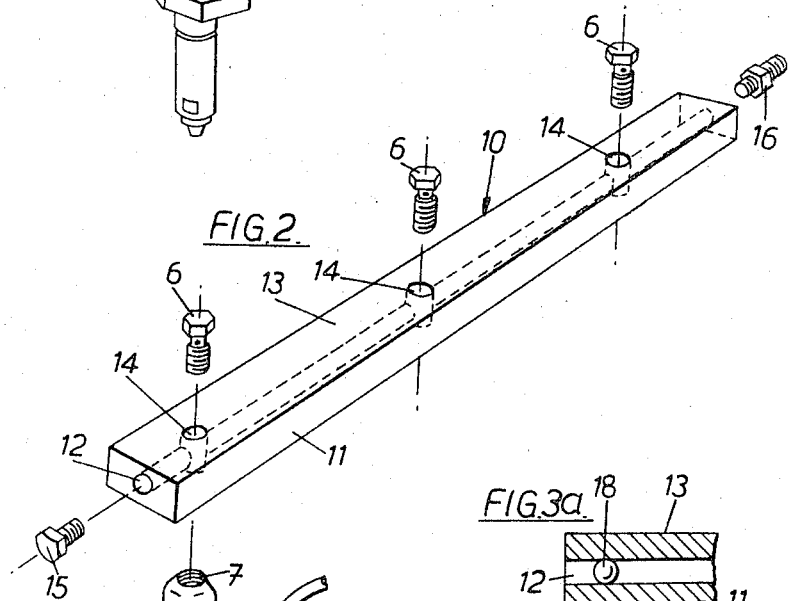
FIG.2
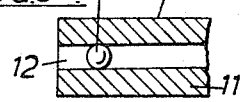
FIG.3a
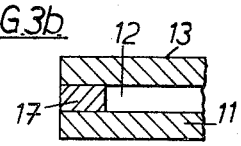
FIG.3b

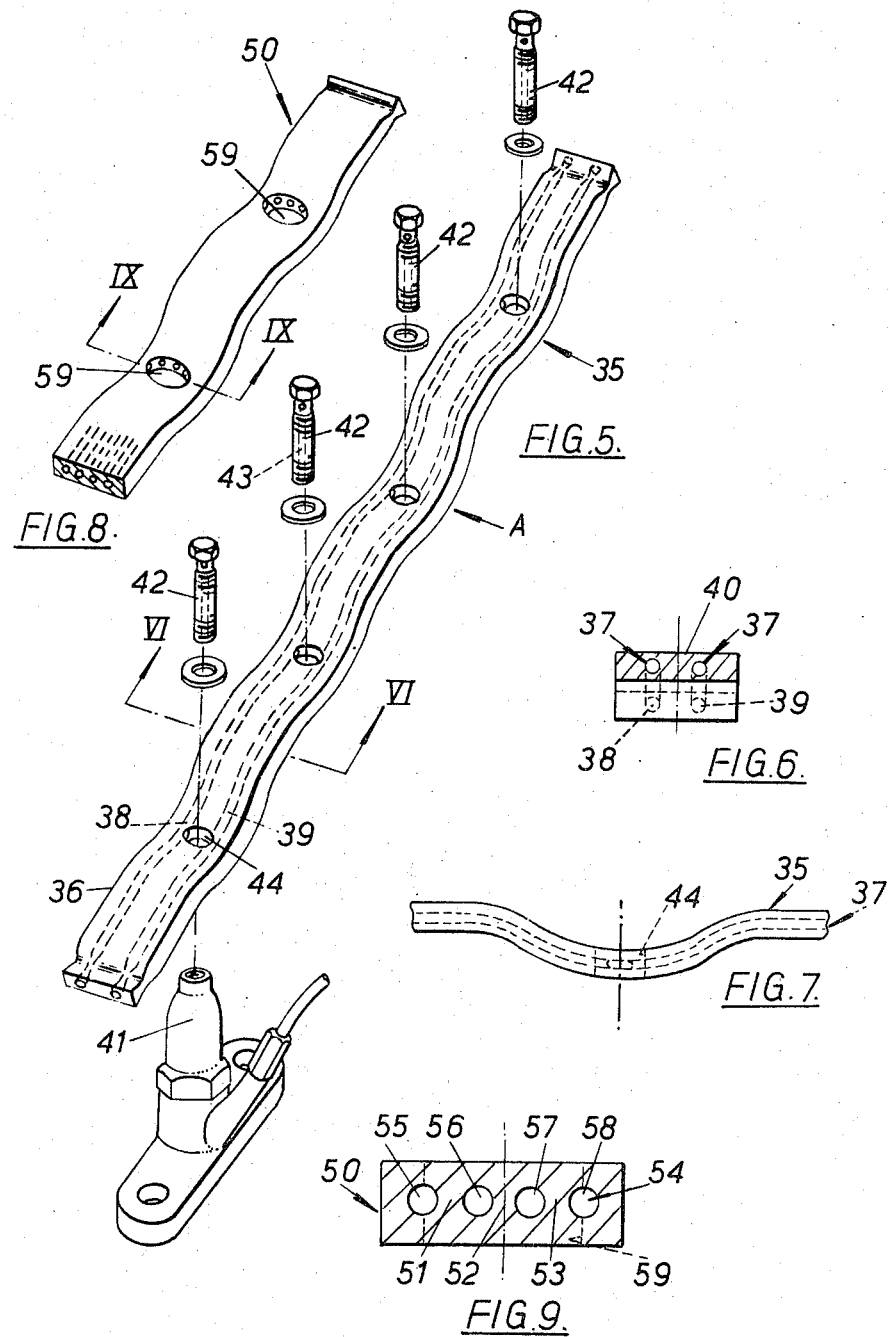

PIPES

The present invention relates to pipes especially, though not exclusively, for use on diesel engines.

Diesel engines are provided with injectors which inject fuel into the cylinders. The injectors operate at very high pressures and internal leakage of fuel from high pressure zones to low pressure zones inevitably occurs. Usually low pressure zones are all connected together and to the lowest pressure side of the fuel system to enable the leaked fuel to be conveyed back to be re-used. Hitherto it has been usual to use a composite pipe made up from so-called banjo connectors silver-soldered to small bore cooper or copper alloy tubes, each banjo connector being secured to an injector by a hollow galleried screw and two aluminium sealing washers. The injectors are usually in a straight line and it has often been necessary to curve the tube between injectors to reduce stresses caused by fastening the composite pipe at several points. The whole pipe assembly has tended to be relatively expensive because of expensive materials used and the assembly time taken. In addition, the work of assembling the composite pipe to the engine has tended to be costly in that care has been required and all the washers had to be correctly positioned at the rate of two per injector.

The object of the present invention is to obviate or mitigate the foregoing disadvantages.

According to the present invention there is provided a pipe comprising a wall of malleable material of non uniform wall thickness having two substantially plane and parallel surfaces defining at least part of the outer surface of said pipe, the passage enclosed by the wall being of such size relative to the thickness of said wall as to permit under a load applied normal to said plane surfaces, local deformation of material at said plane surfaces prior to partial closure of said passage by collapse of said pipe.

Preferably the pipe is extruded from a suitable metal or metal alloy and the section is rectangular.

According further to the present invention there is provided a pipe assembly for use in conveying fluid to or from at least one fixture comprising a pipe having a wall of malleable material of non uniform wall thickness having two substantially plane and parallel surfaces defining at least part of the outer surface of said pipe, said passage being of such size relative to the thickness of said wall as to permit under a load applied normal to said plane surfaces local deformation of material at said plane surfaces prior to partial closure of said passage by collapse of said pipe; at least one hole formed in said pipe normal to said plane surfaces and intersecting said passage; fastening means for fastening said pipe to said fixture, said fastening means having a passageway to permit fluid flow between said fixture and said passage; sealing being effected between said fixture and said pipe and between said fastening means and said pipe by said local deformation.

If the opening of the passage at an end of the pipe assembly requires to be closed and sealed this can be done by using a ball or other plug pushed into the passage so that the metal of the wall is deformed.

Alternatively, if the opening of the passage at one end requires to be connected to another passage a conventional union can be connected thereto by tapping the metal of the wall.

Embodiments of the invention will now be described by way of example only with reference to the accompanying drawings in which:

FIG. 1 of these drawings shows a known arrangement of pipework for collecting surplus or leaked fuel from the injectors of a diesel engine.

FIG. 2 shows a form of pipe assembly according to the present invention.

FIGS. 3a and 3b show cross-sectional details.

FIG. 5 is a perspective view of a pipe according to the present invention.

FIG. 6 is a section on the line II—II of FIG. 5.

FIG. 7 is a view on arrow A on FIG. 5 of part of the pipe shown in FIG. 5.

FIG. 8 is a view similar to FIG. 5 of a partially cut-away pipe having three partitions.

FIG. 9 is an enlarged section on the line V—V of FIG. 8.

Figure 4:
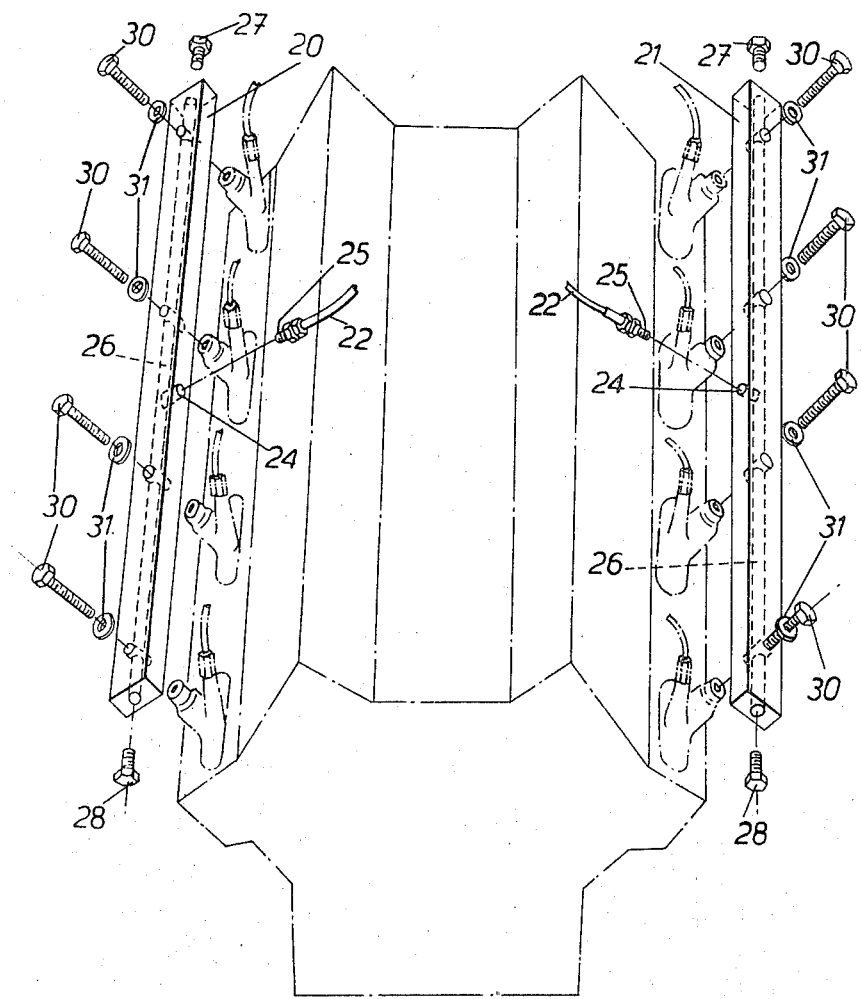
FIG. 4 shows a pipe assembly according to the present invention as used on an engine of V form.

In the pipe assembly shown in FIG. 1, two lengths 1 of small bore copper or copper alloy tube are silver-soldered at each end to a so-called "banjo" union made of brass. The three banjo unions 2, 3, 4 are different to each other, union 2 being single armed, union 3 being double armed, and union 4 being double armed but with a screw fitting 5 on one arm. Each banjo fitting receives a hollow and galleried screw 6 which is adapted to screw into the injector nozzle unit 7 and to hold it in position so that liquid fuel can flow into the pipe assembly and drain out through the screwed arm and a pipe attached thereto back to the fuel tank. Two aluminium sealing washers 8 and 9 are placed on each side of each banjo union and these seal the union when the screw 6 is tightened. Fourteen separate pieces must be brought together to make this assembly and there are six varieties of pieces.

Reference is now made to FIG. 2 which shows a pipe assembly 10 composed of an extruded hollow pipe 11 of aluminium of rectangular cross section and having a circular through passage 12. The broader surfaces 13 of the pipe 11 are through drilled at desired spacing to form holes 14 which intersect passage 12. One end of the pipe 11 is closed by a screwed plug 15 while the other end is fitted with a union 16 which can be connected to the fuel tank of the vehicle or some other suitable low pressure zone in the fuel system. The hollow and galleried screws 6 are suitable for securing the pipe assembly 10 to the three nozzle units 7 as before but no aluminium washers are used. The material of the pipe 11 being aluminium is sufficiently malleable to deform and enable a seal to be achieved. Thus, six separate pieces in four varieties are used.

The relative dimensions of the passage 12 and the rectangle forming the cross section must be chosen so that there is sufficient wall thickness to resist collapsing of the pipe while the screw 6 is tightened sufficiently to form the seal.

Typically the dimensions of the rectangle cross section of the pipe are 0.5625 inches by 0.375 inches, the diameter of the passage 12 being 0.21 inches.

FIGS. 3a and 3b show respectively how a ball bearing 18 or a metal plug 17 can be used to block the passage 12 in place of the screwed plug 15. Alternatively the plug may be of rubber.

FIG. 4 shows a fuel leak off pipe arrangement for a V-8 engine, the general outline of which is shown chain dotted, using a pair of pipes 20, 21 similar to those shown in FIG. 2. It is common practice with a V form of engine to lead the return pipes of the fuel system to a low pressure zone in the centre of the V. Conventionally the leak off pipe for each bank of cylinders comprised two assemblies each similar to that shown in FIG. 1 which were connected to the fuel return pipe and to each other by a brass T-shaped compression fitting. This fitting was expensive and time-consuming to fit. According to an embodiment of the present invention return pipes 22 and 23 are fitted to the pipes 20, 21 respectively by drilling and tapping a hole 24 in the side of each of the pipes 20, 21. A conventional double-ended fitting 25 is then screwed into each of the holes 24 and the return pipes 22, 23 fitted to the respective fitting 25. The hole 24 is drilled into the through passageway 26, the ends of which are sealed by plugs 27, 28. The pipes 20, 21 are fasteneed to the injectors of the engine by banjo bolts 30 which are provided with aluminium washers 31 to ensure sealing. Thus the T-shaped fitting is no longer required, the return pipe being connected at any convenient point simply by drilling a hole in the side of each of the pipes 20, 21.

The cross section of the pipe need not be rectangular but two parallel flat surfaces are needed. The assembly will accommodate slight malalignment of the fixtures which tend to place the pipe assembly in shear, torsion or bending when being fitted. Also the fixtures need not necessarily be in a straight line, the pipe assembly can be bent to a degree to fit non-aligned fixtures. The pipe may also be bent (in some cases to a radius of one inch) to clear other engine fittings. To prevent damage to the surface of the pipe as the bolt is screwed down washers may be put either side of the pipe.

FIGS. 5 to 7 show a further embodiment of a pipe similar to that shown in FIGS. 2 and 4. A pipe 35 comprises a wall 36 enclosing a passage 37. The passage 37 is divided into two channels 38, 39 by a partition 40. The pipe 35 is adapted to be fastened to fixtures 41, for example fuel injectors of a diesel engine, by bolts 42 which are provided with a through conduit 43. Holes 44 which are formed transverse to the pipe 36 by drilling or punching intersect both channels 38, 39 of the passage 37.

Fluid may thus pass from the fixtures 41 through the conduit 43 formed in the bolt 42 and into and along both channels 38 and 39 of the passage 37 in the pipe 35 to drain.

The ends of the pipe 35 may be sealed by crimping so that the passage 37 is completely blocked. This can be done at the time of punching the holes 44 by use of a combination die and form tool which in addition to punching and crimping may also bend the pipe to a desired shape. Crimping and/or bending may be carried out after the pipe 35 has been attached to the fixtures 41.

Sealing between the pipe 35 and the fixtures 41 and between the pipe 35 and the bolts 42 is achieved by local deformation of the surface of pipe 35 as the bolt 42 is tightened. However, in view of the possibility of damage to the surface by rotation of the bolt head a washer may be placed under the bolt head for protection.

In order to accommodate expansion and contraction of the pipe 35 it can be bent into a bowl between the successive fixtures 41 either before or after any of the other operations performed on it. Further, the pipe may be readily bent to clear an obstruction to its normal run.

FIGS. 8 and 9 show a pipe 50 similar to that shown in FIGS. 5 to 7 but with three partitions 51, 52, 53 which divide the passage 54 into four channels 55, 56, 57, 58. A through hole 59 may be punched or drilled as previously described with reference to FIGS. 5 to 7 and may intersect all the channels 55 to 58 or any convenient number thereof.

Typically the dimensions of the pipe 50 are 9/16 inch wide, 3/16 inch deep with each channel of 1/16 inch diameter spaced at ⅛ inch centres. The hole 59 may be of 5/16 inch clearance diameter which will intersect all four channels of the pipe. By using more than one channel the cross sectional area of the passage may be maintained with a reduction in the quantity of material used in the pipe.

The pipes shown in FIGS. 2 to 9 may be extruded from a metal alloy, typically aluminum to British Standard Specification 1474 Condition H.V.9.M., or a suitable plastics composition or alternatively a metal alloy coated with plastics material.

The advantages of the present invention are that the cost of the assembly is reduced partially because of the reduction in the number of parts, partially because of the time and labour involved in making it up and partly because of the ease of fitting the assembly to the engine. A further advantage is that it can be removed easily in four realtively large pieces which are not easily lost.

The foregoing description has been drafted with reference to partitions 40, 51, 52 and 53 which divide the passage into several channels. In practice the pipe would be extruded with a number of axial circular filamentary holes which nevertheless together form a single passage along the pipe. The adoption of the expression "partitions" is for the purpose of being able to recite positive structural elements in the claims of this and other patent applications.

I claim:

1. A pipe comprising a wall of malleable material of non uniform wall thickness having two substantially plane and parallel surfaces defining at least part of the outer surface of said pipe, said wall defining a passage of such size relative to the thickness of said wall as to permit under a load applied normal to said plane surfaces, local deformation of material at said plane surfaces without closure of said passage by collapse of said pipe.

2. A pipe according to claim 1 in which the cross section of said pipe is rectangular.

3. A pipe according to claim 1 in which the cross section of said passage is circular.

4. A pipe according to claims 1 in which said passage is divided along the length of said pipe by a partition into at least two channels, said channels together constituting said passage.

5. A pipe according to claim 4 in which the cross section of said channels is circular.

6. A pipe according to claims 4 in which at least one hole is formed in said pipe normal to said plane surfaces, said hole intersecting said passage.

7. A pipe according to claim 6 in which said hole intersects off of said channels.

8. A pipe according to claim 1 wherein said material at said plane surfaces is plastically deformable material which may be constituted by said malleable material.

9. A pipe according to claim 8 in the case where the plane surfaces of said pipe are formed of said malleable material in which sealing between said fastening means and said pipe and between said fixture and said pipe is effected by local deformation of said plane surface of said pipe.

10. A pipe according to claim 1 in which said pipe is extruded from a suitable metal or metal alloy.

11. A pipe according to claim 1 in which said pipe is extruded from a plastics material.

12. A pipe according to claim 1 in which at least one end of said passage is sealed by the insertion of at least one plug arranged so as to deform the material of said wall of said pipe.

13. A pipe according to claim 12 in which said plug is a ball.

14. A pipe according to claims 1 in which at least one end of said passage is sealed by crimping said one end, thereby completely blocking said passage.

15. A pipe assembly for use in conveying fluid to or from at least one fixture comprising a pipe having a wall of malleable material of non uniform wall thickness having two substantially plane and parallel surfaces defining at least part of the outer surface of said pipe, the passage enclosed by the pipe being of such size relative to the thickness of said wall as to permit under a load applied normal to said plane surfaces local deformation of material at said plane surfaces prior to partial closure of said passage by collapse of said pipe, at least one hole formed in said pipe normal to said plane surfaces and intersecting said passage; fastening means for fastening said pipe to said fixture, said fastening means having a passageway to permit fluid flow between said fixture and said passage; sealing being effected between said fixture and said pipe and between said fastening means and said pipe by said local deformation.

* * * * *